(12) United States Patent
Wooten

(10) Patent No.: US 7,258,359 B2
(45) Date of Patent: Aug. 21, 2007

(54) TRAILER HITCH ASSEMBLY

(75) Inventor: Donald W. Wooten, Dallas, TX (US)

(73) Assignee: Wooten Metal, Inc., Dallas, TX (US)

( * ) Notice: Subject to any disclaimer, the term of this patent is extended or adjusted under 35 U.S.C. 154(b) by 107 days.

(21) Appl. No.: 11/041,376

(22) Filed: Jan. 24, 2005

(65) Prior Publication Data

US 2006/0163843 A1    Jul. 27, 2006

(51) Int. Cl.
B60D 1/06      (2006.01)
B60R 3/02      (2006.01)

(52) U.S. Cl. .................... 280/491.5; 280/164.1
(58) Field of Classification Search ............. 280/491.1, 280/491.2, 491.5, 163, 164.1, 166, 491.3, 280/541; 224/519, 520, 521
See application file for complete search history.

(56) References Cited

U.S. PATENT DOCUMENTS

| | | | |
|---|---|---|---|
| 2,544,185 A | | 3/1951 | Sargent |
| 2,671,674 A | | 3/1954 | Derksen |
| 4,194,754 A | | 3/1980 | Hightower |
| 4,662,647 A | * | 5/1987 | Calvert .................... 280/490.1 |
| 5,277,448 A | | 1/1994 | Colibert |
| 5,340,177 A | | 8/1994 | Maxam |
| 5,358,269 A | | 10/1994 | Jakeman et al. |
| 5,454,496 A | * | 10/1995 | Sumida et al. ............. 224/509 |
| 5,476,279 A | | 12/1995 | Klemetsen |
| 5,513,866 A | | 5/1996 | Sisson |
| D376,780 S | * | 12/1996 | McCoy ..................... D12/162 |
| 5,738,362 A | | 4/1998 | Ludwick |
| 5,803,475 A | * | 9/1998 | Dick ......................... 280/163 |
| 5,941,550 A | | 8/1999 | Szczypski |
| 5,950,890 A | * | 9/1999 | Darby ....................... 224/402 |
| 6,149,181 A | | 11/2000 | Biederman |
| 6,170,843 B1 | | 1/2001 | Maxwell et al. |
| 6,237,927 B1 | | 5/2001 | Debo |
| 6,474,668 B2 | | 11/2002 | Debo |
| 6,511,086 B2 | | 1/2003 | Schlicht |
| 6,554,311 B1 | | 4/2003 | Blankenship et al. |
| 6,866,285 B1 | * | 3/2005 | Stamp ..................... 280/491.5 |
| 6,993,806 B2 | * | 2/2006 | Finley ....................... 15/161 |
| 2001/0045720 A1 | | 11/2001 | Schlict |
| 2002/0060440 A1 | | 5/2002 | Storer |
| 2004/0032112 A1 | | 2/2004 | Reese et al. |
| 2004/0160034 A1 | | 8/2004 | Mitchell |
| 2004/0188982 A1 | | 9/2004 | Westerdale |

* cited by examiner

*Primary Examiner*—Anne Marie Boehler
(74) *Attorney, Agent, or Firm*—Dunlap, Codding & Rogers, P.C.

(57) ABSTRACT

A trailer hitch assembly is removably attachable to a receiver connected to a towing vehicle. The receiver has a rectangular port defining a receptacle. The trailer hitch assembly includes a support arm assembly and at least one hitch ball. The support arm assembly has a first support arm and a second support arm. Each of the first and second support arms are sized and dimensioned to be disposed in the receptacle for attachment to the receiver. The at least one hitch ball is supported by the support arm assembly.

5 Claims, 2 Drawing Sheets

TRAILER HITCH ASSEMBLY

CROSS REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to trailer hitches and more particularly, but not by way of limitation, to an improved trailer hitch assembly removably attached to a towing vehicle.

2. Description of the Related Art

Trailer hitches are well known in the towing industry. There are many different types of trailer hitch configurations attached to the back end of a variety of different vehicles, such as pick-up trucks, flatbed trucks, station wagons, sport utility vehicles and the like. The trailer hitches are used to tow many different types of trailers. Generally, trailer hitches which are attached to the back end of a vehicle protrude from the rear of the vehicle, thus increasing the length of the vehicle. When the trailer is attached to the hitch connected to the vehicle the fact that the hitch protrudes from the vehicle doesn't raise much concern. However, concerns may arise when the trailer is not connected to the hitch. For example, due to the increase in length of the vehicle most drivers tend to misjudge the distance of objects behind the vehicle, thus raising the risk of accidents with other vehicles or damage to the driver's vehicle.

To avoid such problems, most drivers will remove the trailer hitch from the receiver connected to the vehicle and place it in the trunk, back, or cab of the vehicle. However, this increases the chances of the vehicle becoming dirty due to the trailer hitch being greasy or dirty. Further, driving with a trailer hitch in the open cab of a vehicle increases the risk of damage to an individual or the vehicle. For example, during a traffic accident the trailer hitch can become a flying projectile.

To this end, although trailer hitches of the existing art are operable, further improvements are desirable to enhance the ease of use of the trailer hitch. It is to such a trailer hitch assembly that the present invention is directed.

DETAILED DESCRIPTION OF THE INVENTION

Figure 1:
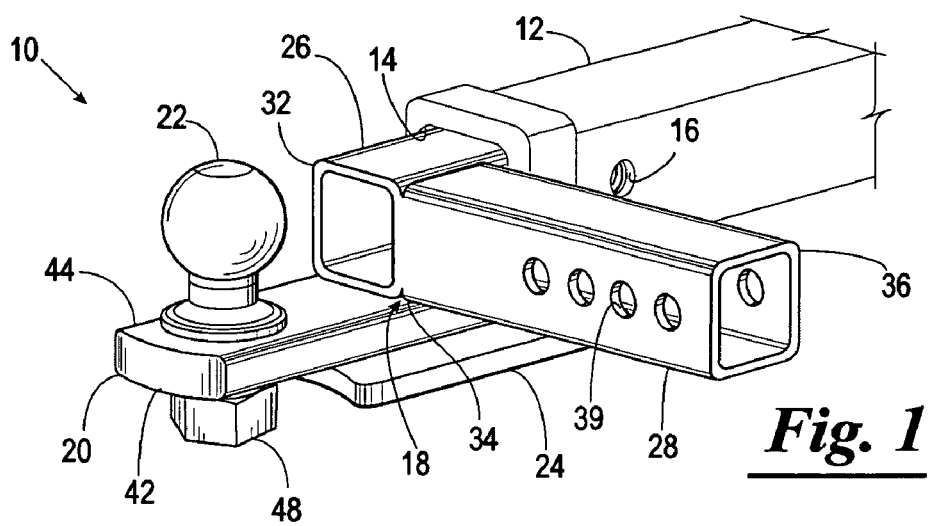
FIG. 1 is a perspective view of a trailer hitch assembly constructed in accordance with the present invention removably attachable to a receiver of a towing vehicle in a towing position.
Figure 2:
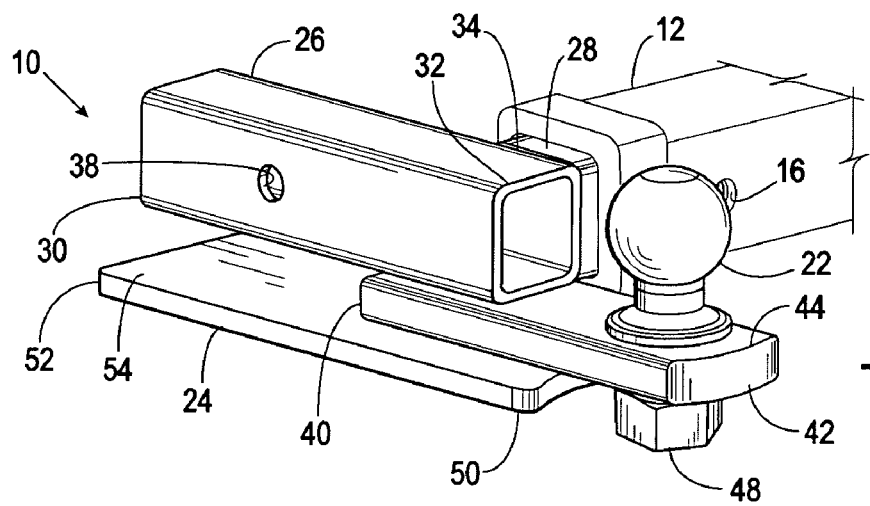
FIG. 2 is a perspective view of the trailer hitch assembly removably attached to the towing vehicle in a first stowed position.
Figure 3:
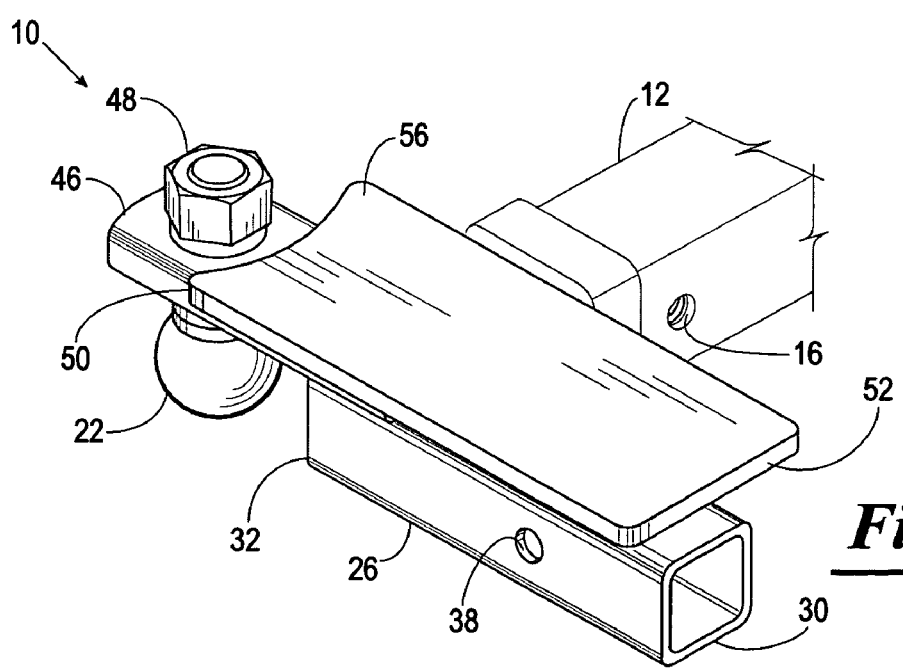
FIG. 3 is a perspective view of the trailer hitch assembly removably attached to the towing vehicle in a second stowed position.
Figure 4:
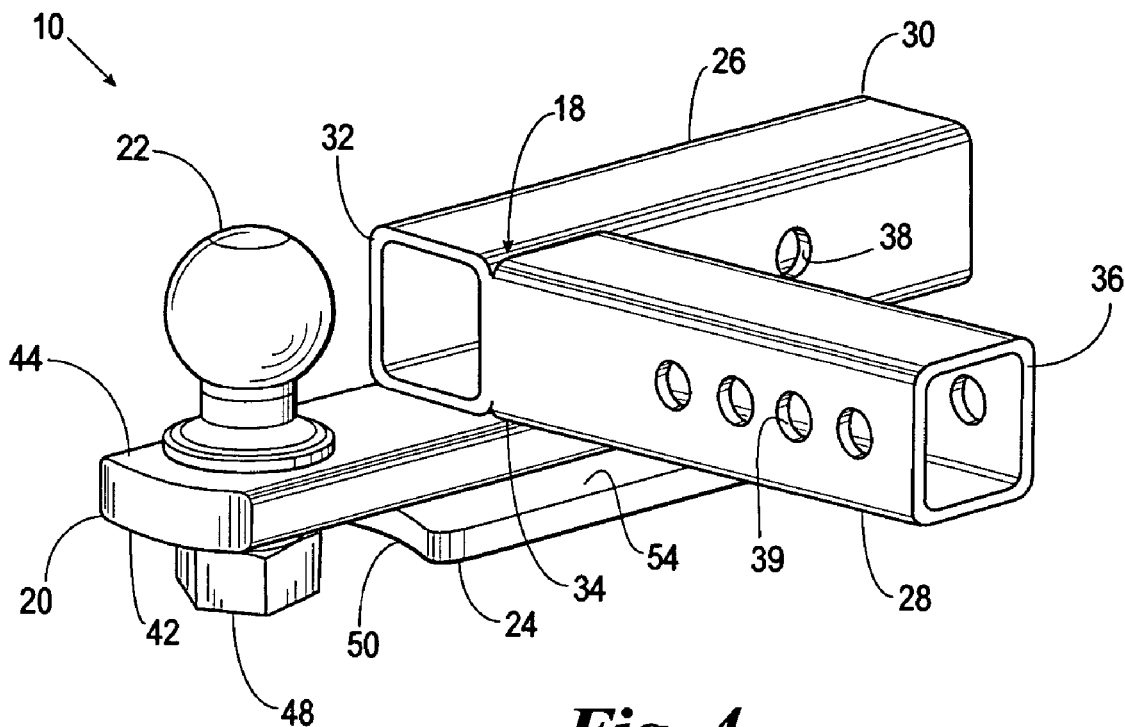
FIG. 4 is a perspective view of the trailer hitch assembly of FIG. 1.
Figure 5:
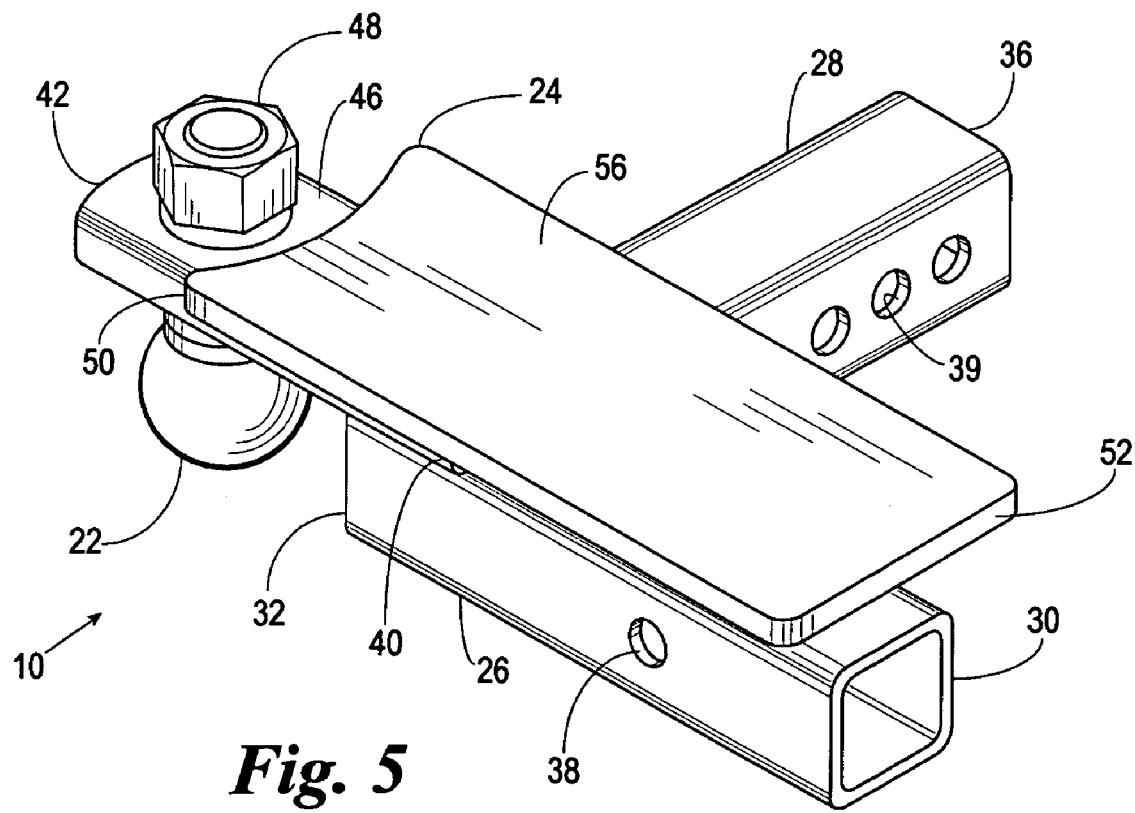
FIG. 5 is a perspective view of the trailer hitch assembly of FIG. 3.

Referring now to the drawings and in particular to FIGS. 1-5, shown therein and designated by reference numeral 10 is a trailer hitch assembly constructed in accordance with the present invention. The trailer hitch assembly 10 is removably attachable to a receiver 12 connected to a towing vehicle (not shown) in a towing position (FIG. 1), a first stowed position (FIG. 2) and a second stowed position (FIG. 3). The towing vehicle can be any vehicle used for towing such as a pick-up truck, flatbed truck, sport utility vehicle, station wagon, snowmobile, mower, or the like. The receiver 12 has a rectangular port defining a receptacle 14. The receiver 12 also includes one or more holes 16 which can be used to secure the trailer hitch assembly 10 to the vehicle, as will be discussed further herein. The construction and attachment of receivers is well known in the art and could include various configurations. Thus, no further description or discussion will be made with respect to the receiver 12.

The trailer hitch assembly 10 includes a support arm assembly 18, a ball support plate 20, a hitch ball 22, and a step member 24. The support arm assembly 18 has a first support arm 26 and a second support arm 28. The first support arm 26 and the second support arm 28 can be constructed from steel, aluminum, or any other rigid material and can be produced at various lengths. Further, although the first support arm 26 and the second support arm 28 are shown as tubular, it should be understood that the first support arm 26 and the second support arm 28 may be solid as well. The first and second support arms 26 and 28, respectively, are sized and dimensioned to be disposed in the receptacle 14 for attachment to the receiver 12.

The first support arm 26 has a first end 30 and a second end 32. The second support arm 28 has a first end 34 and a second end 36. The second end 32 of the first support arm 26 is connected to the first end 34 of the second support arm 28 such that when the first end of the first arm 26 is positioned within the receptacle 14, the second support arm 28 extends perpendicular to a longitudinal axis of the receptacle 14. Thus, the first support arm 26 and the second support arm 28 are substantially perpendicular to one another. However, it should be understood that the connection formed between the first support arm 26 and the second support arm 28 may not be perpendicular so long as the second support arm 28 extends a distance away from the first support arm 26 such that the first and second support arms 26 and 28 can be positioned individually within the receptacle 14. The first support arm 26 and the second support arm 28 can be connected by any means known in the art, such as welding, bonding, bolting, or any other such means known in the art for connecting one thing to another.

The first support arm 26 is shown provided with a hole 38 and the second support arm 28 is provided with holes 39. When the first support arm 26 is disposed in the receptacle 14, the hole 38 is aligned with the corresponding hole 16 in the receptacle 14. A pin or bolt (not shown) is inserted into the holes 38 and 16 to secure the first support arm 26 to the receiver 12. Likewise, when the second support arm 28 is disposed in the receptacle 14, one of the holes 39 is aligned with the hole 16 in the receptacle 14. A pin is inserted into the holes 39 and 16 to secure the second support arm 28 to the receiver 12.

The ball support plate 20 has a first end 40, a second end 42, a first side 44, and a second side 46. The first end 40 of the ball support plate 20 is supported by the support arm assembly 18. The first end 40 of the ball support plate 20 can be connected to the support arm assembly 18 by any means known in the art, such as welding, bonding, bolting, or other such means known in the art for connecting one thing to another.

At least one hitch ball 22 is supported by the support arm assembly 18. Preferably, as shown in FIGS. 1-5, the hitch ball 22 is mounted near the second end 42 of the ball support plate 20. Typically, the hitch ball 22 is fixed to a threaded screw which penetrates the ball support plate 20 and a bolt 48 is screwed thereon to secure the hitch ball 22 to the ball support plate 20. However, it should be understood that the hitch ball 22 can be attached to the ball support plate 20 by any means known in the art, such as welding, bonding, or other such means. Although a single hitch ball 22 is shown in FIGS. 1-5, it should be understood that the support arm assembly 18 and the ball support plate 20 can each be adapted so that a plurality of hitch balls may be attached.

The step member 24 has a first end 50, a second end 52, a first side 54 and a second side 56. The first side 54 of the step member 24 is shown attached to the second side 46 of the ball support plate 20 near the first end 50 of the step member 24. The step member 24 may be connected by any means known in the art, such as welding, bonding, bolting, or the like. The trailer hitch assembly 10 may be inverted, as shown in FIG. 3, so that the second side 56 of the step member 24 can be used as a step by the user of the trailer hitch assembly 10. Optionally, the first and second support arms 26 and 28, respectively, can be used as a step when not disposed in the receptacle 14 of the receiver 12, as shown in FIGS. 1 and 2.

In use, referring to FIG. 1, the trailer hitch assembly 10 is placed in the towing position wherein the first support arm 26 is disposed in the receptacle 14 so that the hitch ball is positioned so as to engage or receive a trailer (not shown) and the second support arm 28 extends perpendicular to a longitudinal axis of the receptacle 14. Referring to FIG. 2, the trailer hitch assembly 10 is placed in the first stowed position wherein the first support arm 26 is removed from the receptacle 14 and the second support arm 28 is disposed in the receptacle 14 such that the first support arm 26 extends perpendicular to the longitudinal axis of the receptacle 14. Referring to FIG. 3, the trailer hitch assembly 10 is placed in the second stowed position wherein the trailer hitch assembly 10 is inverted so that the second side 56 of the step member 24 may be utilized as a step by the user of the trailer hitch assembly 10. The second support arm 28 is disposed in the receptacle 14 and the first support arm 26 and the step member 24 extend perpendicular to the longitudinal axis of the receptacle 14.

Changes may be made in the combinations, operations, and arrangements of the various parts and elements described herein without departing from the spirit and the scope of the invention as defined in the following claims.

What is claimed is:

1. A method for removably attaching a trailer hitch assembly to a receiver connected to a towing vehicle, the receiver having a rectangular port defining a receptacle, the method comprising the steps of:

providing the trailer hitch assembly, comprising:

a support arm assembly having a first support arm and a second support arm, each of the first and second support arms being sized and dimensioned to be disposed in the receptacle for attachment to the receiver, the support arm assembly constructed so as to be positioned in a towing position when the first support arm is positioned within the receptacle, and the support arm assembly constructed so as to be positioned in one of a first and second stowed position when the second support arm is positioned within the receptacle; and at least one hitch ball supported by the support arm assembly;

disposing the first support arm of the support arm assembly in the receptacle;

removing the first support arm of the support arm assembly from the receptacle; and disposing the second support arm of the support arm assembly in the receptacle so as to position the support arm assembly in one of the first and second stowed positions.

2. The method of claim 1, wherein the step of disposing the second support arm further comprises the step of inverting the support arm assembly to position the support arm assembly in the second stowed position.

3. The method of claim 1, wherein the first support arm and the second support arm are positioned perpendicular to one another.

4. The method of claim 1, wherein the first and second support arms are mounted such that upon the first support arm being positioned within the receptacle the second support arm extends perpendicular to a longitudinal axis of the receptacle.

5. The method of claim 1, wherein the first and second support arms are mounted such that upon the second support arm being positioned within the receptacle the first support arm extends perpendicular to a longitudinal axis of the receptacle.

* * * * *